(12) United States Patent
Hopkins

(10) Patent No.: US 6,789,435 B2
(45) Date of Patent: Sep. 14, 2004

(54) HERMETICALLY SEALED LOAD CELL

(75) Inventor: Randall K. Hopkins, Mendon, MA (US)

(73) Assignee: Hottinger Baldwin Measurements, Inc., Marlboro, MA (US)

(*) Notice: Subject to any disclaimer, the term of this patent is extended or adjusted under 35 U.S.C. 154(b) by 0 days.

(21) Appl. No.: 10/263,041

(22) Filed: Oct. 1, 2002

(65) Prior Publication Data
US 2004/0060372 A1 Apr. 1, 2004

(51) Int. Cl.[7] .................................................. G01L 1/04
(52) U.S. Cl. ......................... 73/862.632; 73/862.637; 177/211; 177/229
(58) Field of Search ............... 73/862, 862.59–862.642; 177/211, 229

(56) References Cited

U.S. PATENT DOCUMENTS

| | | | |
|---|---|---|---|
| 3,696,317 A | * 10/1972 | Farr | 338/5 |
| 4,343,197 A | * 8/1982 | Suzuki et al. | 73/862.633 |
| 4,596,155 A | * 6/1986 | Kistler | 73/862.632 |
| 5,220,971 A | * 6/1993 | Farr | 177/229 |
| 5,313,022 A | * 5/1994 | Piroozmandi et al. | 177/211 |
| 5,359,903 A | * 11/1994 | Steiger et al. | 73/862.627 |

OTHER PUBLICATIONS

Flintec, Inc.; Type PC6 Load Cell; Specification sheet; E 28 01/01; pp. 1/2 and 2/2.

Website page, www.rlws.com/lit/load-cells/specs/points/RLHPS.html; RLHPS Single Point, Stainless Steel, Hermetically Sealed, IP68; RLHPS—Specifications; Rice Lake Weighing Systems; Product Information, 2002.

Aumard et al.; U.S. patent application Publication No. 2003/0111277 A1, Publication Date: Jun. 19, 2003, entitled: "Measuring Sensor", cover sheet, 4 sheets of drawings and pp. 1 to 3.

Internet web page; http://www.scaime.com/English/news/whatsnew.html; Dec. 3, 2002; SCAIME, Inc., Mahwah, N.J.

* cited by examiner

Primary Examiner—Edward Lefkowitz
Assistant Examiner—Alandra Ellington
(74) Attorney, Agent, or Firm—W. F. Fasse; W. G. Fasse

(57) ABSTRACT

A load cell includes a strain gage on a narrow sensing section of a beam element, on a planar outer surface facing outwardly from the median plane extending longitudinally through the cell. A cup-shaped seal cap enclosing the strain gage is laser welded onto the outer surface of the beam element to form a hermetic seal. A wiring tunnel in the load cell body leads from inside the seal cap into an electronics cavity for wires to pass from the strain gage to electronic circuitry. The load cell body and seal caps, made of stainless steel or titanium, are hermetically sealed for use in harsh environments. The seal caps have a minimal influence on strain in the sensing sections. The load cell has a low-end capacity of 5 kg or less.

33 Claims, 3 Drawing Sheets

HERMETICALLY SEALED LOAD CELL

FIELD OF THE INVENTION

The invention relates to the provision of a hermetic seal for the strain gages of a load cell.

BACKGROUND INFORMATION

A conventional load cell of the bending beam type includes a live end block, a dead end block, and plural bending beam elements extending between and interconnecting the live end block and the dead end block. Foil strain gages or the like are affixed, e.g. adhesively mounted, on the thin sensing sections of the bending beam elements. The strain gages are connected by wires to the sensing electronics, e.g. a weighing bridge circuit. The dead end block is bolted to a stationary support, while a live load is introduced into the live end block. The live load, i.e. the load to be weighed, causes the bending beam arrangement to deflect, thereby inducing corresponding strains in the bending beam elements. The strains of the bending beam elements are sensed and measured by the strain gages, whereby the weight of the applied live load can ultimately be determined.

Such bending beam load cells are often used in so-called single point applications, in which a single load cell is provided to weigh an entire load. For example, the entire load of a weighing platform is introduced into the live load introduction end of the bending beam load cell, in order to weigh the live load on the weighing platform.

In most applications, it is necessary to seal and protect the delicate strain gages from environmental influences which include mechanical abrasion or other mechanical damage, corrosion and etching by harsh chemicals and the like, oxidation, and other undesirable influences that destroy or damage the strain gages or interfere with the proper functioning thereof. It has become known to apply a polymeric seal layer, such as a layer or film of polybutylene over the strain gages. It has further become known to seal, embed, or pot the strain gages in a sealing mass of room temperature vulcanizing (RTV) silicone or the like.

While such known sealing methods provide an effective environmental seal, such measures are temporary and not very robust. Namely, such polybutylene, silicone, or other polymeric seal layers have been found to leak, breakdown, or peel off under harsh environment applications, such as in the food production and preparation industry, and in the chemical processing and handling industry. In such harsh environment applications, the load cells, and particularly the seal areas provided over the strain gages, are exposed to harsh or severe chemicals, as well as frequent cleaning, for example using solvents and the like, and using mechanical scrubbing or pressure washing procedures. Under such severe conditions, conventional polymeric seals on the strain gages of load cells have been found to be unsatisfactory due to a short reliable operating lifespan before leakage or peeling of the seal material occurs.

To provide a longer-term, more-durable hermetic seal, in comparison to the above mentioned polymeric seals, it has also become conventionally known to encapsulate or seal the strain gages with a stainless steel seal member. A problem that arises when trying to use a metal seal member, is that the seal member itself takes up some of the stress and thus influences the development of the strain in the sensing sections of the bending beam arrangement. The particular conventional load cell configuration that has become known for addressing the above problems is schematically illustrated in a simplified manner in present FIG. 1.

As shown in FIG. 1, a conventional bending beam load cell 1' having a stainless steel hermetic seal is a rather complicated triple beam arrangement 2' including an upper beam element 5', a lower beam element 6', and a central beam element 7', respectively extending and connected between the live load introduction end 3' and the dead end 4'. The entire bending beam arrangement 2' is machined from a single monolithic block of stainless steel. The complicated configuration as shown in FIG. 1 results in a rather high machining effort and cost. Particularly, the upper and lower beam elements 5' and 6' are substantially straight beam elements, while the central beam element 7' is a circular ring element. The upper and lower beam elements 5' and 6' maintain a parallelogram configuration, and passively handle off-center load application moments. On the other hand, the central beam element 7' including the circular ring element is the active bending element that takes up the load to be measured.

For measuring the strain of the circular ring element and thereby measuring the applied live load, strain gages 9' are applied on the inner circumferential surface of the ring element of the central bending beam element 7'. In FIG. 1, the strain gages 9' are merely schematically indicated as a dashed line. Actually, the strain gages 9' are not visible from the outside, because they are encapsulated and hermetically sealed by a cylindrical sleeve or tube 10' of stainless steel that is arranged in the interior of the ring element of the central bending beam element 7'. The hermetic seal tube or sleeve 10' is welded around the edges to the ring-shaped element of the central bending beam element 7', to achieve the hermetic seal with a complete stainless steel enclosure. Thus, only a stainless steel surface is exposed to the environment, and the strain gages are hermetically sealed therein. An electrical cable 12' is connected and sealed into the dead end 4' to conduct the weighing signals provided by the strain gages 9' and pre-processed by electronic circuitry in the load cell 1'.

While the conventional hermetically sealed stainless steel bending beam load cell schematically illustrated in FIG. 1 provides an effective durable hermetic seal and is suitable for use in harsh or extreme environmental conditions, it also suffers several disadvantages. The machining required for the complex configuration of the load cell results in rather high machining efforts and cost. Also, the complex configuration with several interior surfaces, corners, notches, grooves, and the like forms spaces in which liquids will puddle. This is a disadvantage in the food processing and chemical processing industries, in which the load cells are frequently exposed to various liquids during use and during cleaning procedures. The puddling and accumulation in the "nooks and crannies" of the complex configuration of the load cell make it difficult to keep the load cell clean, and make higher demands on the long term corrosion resistance and hermetic sealing.

Also, the complex triple beam configuration including a ring-shaped strainable element necessarily leads to a rather large profile height for a given beam length and load capacity. Moreover, this triple beam arrangement, and the use of a cylindrical internal stainless steel sleeve or tube to provide the hermetic seal, make it difficult to achieve a low load capacity. Namely, due to the influence of the hermetic seal tube or sleeve 10' and due to the arrangement of three bending beam elements 5', 6' and 7', a certain minimum load is required to sufficiently strain the central bending beam 7' for an accurate weighing result. The minimum capacity for such load cells is typically about 20 kg, although claims of a capacity down to about 6 kg have been noted.

SUMMARY OF THE INVENTION

In view of the above, it is an object of the invention to provide a load cell with a hermetic seal for the strain gages thereof, while achieving a lower capacity range, a simpler configuration, a reduced machining effort, a reduced cost, a lower profile height, and an easy retrofit capability to replace previously existing load cells. The invention further aims to provide a hermetic seal configuration for a load cell, that achieves improved separation or isolation of the strain from the seal elements, so as to minimize the influence of the hermetic seal elements on the strain development in the sensing sections of the load cell. The invention further aims to avoid or overcome the disadvantages of the prior art, and to achieve additional advantages, as apparent from the present specification. The attainment of these objects and advantages is, however, not a requirement of the present invention.

The above objects have been achieved according to the invention in a load cell comprising a load cell body including a strainable sensing section, a strain gage arranged on a surface of the sensing section of the load cell body, and a cup-shaped seal cap that is arranged on the surface of the load cell body so as to enclose the strain gage. The seal cap is heat-fused onto the surface, so as to form a hermetically sealed joint therebetween. The relevant surface of the load cell body according to one feature of the invention is a flat planar surface. According to another feature of the invention, this surface of the load cell body on which the strain gage and the cup-shaped seal cap are arranged is an outer surface that faces outwardly away from a median plane extending longitudinally through the load cell body. The heat-fusing of the seal cap onto this surface of the load cell body is preferably achieved by laser welding.

According to a further detailed embodiment of the invention, the above objects have been achieved in a load cell comprising a live load introduction end, a dead end, at least one bending beam element extending and connected between the live end and the dead end, at least one strain gage arranged on a surface of the bending beam element at a respective sensing section thereof, and a cup-shaped seal cap that is arranged on the beam surface so as to enclose the respective strain gage therein, and that is heat-fused (e.g. laser welded) onto the beam surface so as to form a hermetically sealed joint therebetween.

With this structure and arrangement of the load cell, the entire load cell is hermetically sealed, and particularly the strain gages are enclosed and hermetically sealed by the seal cap or caps. The structure and the fabrication steps for making the load cell are quite simple, so that the load cell is economical, while still being permanently hermetically sealed for applications in harsh or extreme environmental conditions. The seal caps arranged on an external or outer surface are easily accessible for the original fabrication, and for later servicing if that should become necessary. The seal caps have only a minimal influence on the strain development in the sensing sections of the bending beam elements. Particularly, the stress and strain is substantially dissipated by elastic flexing of the sidewalls of the seal cap, so that the flat base or outer lid of the seal cap takes up essentially no stress. Thus, the strain development and strain measurement in the sensing sections of the bending beam elements is only minimally influenced, so that the load cell can be designed to handle a minimum load at or below 5 kg, or even down to 1 kg, with certifiable accuracy.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
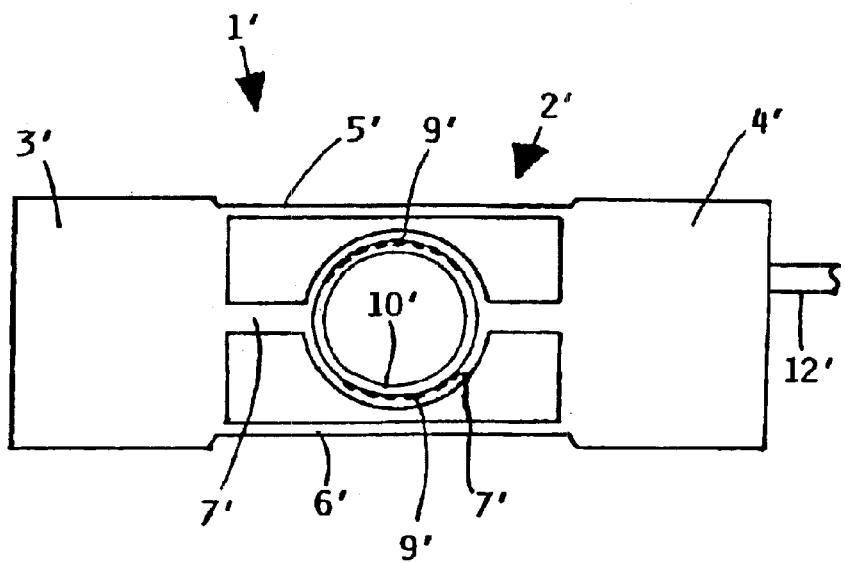
FIG. 1 is a simplified schematic side view of a hermetically sealed triple beam load cell according to the prior art.

The conventional triple beam load cell 1' as shown in FIG. 1 has been discussed in detail above. While the components of the conventional load cell 1' have been labeled with reference numbers supplemented by a prime mark, the corresponding or related components of the inventive load cell 1 will be labeled with the corresponding reference numbers without a prime mark in FIGS. 2 to 10.

Figure 2:
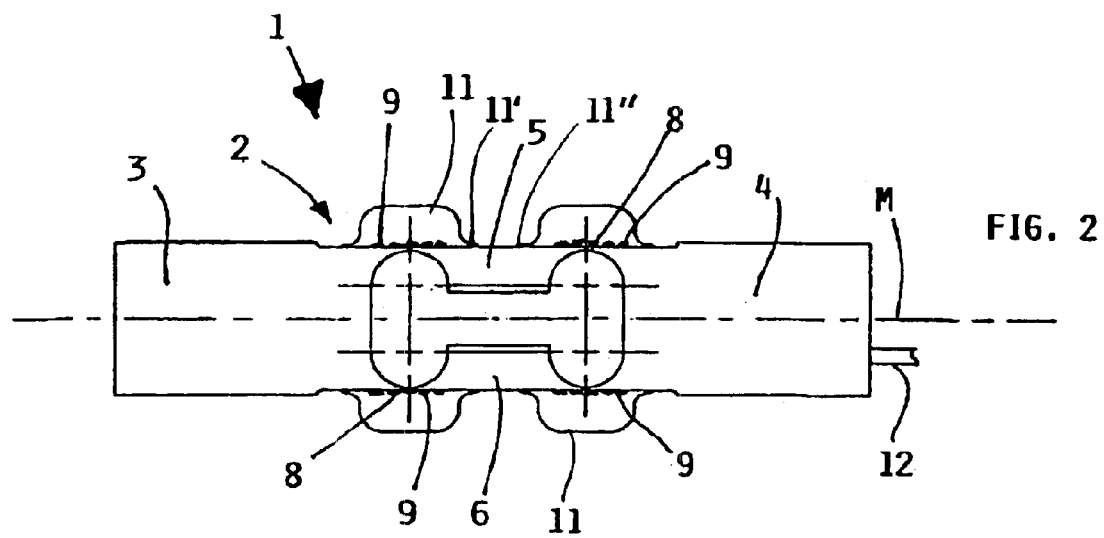
FIG. 2 is a schematic side view of a hermetically sealed double beam load cell according to the invention.

FIG. 2 schematically shows a basic overview of the inventive bending beam type load cell 1. The load cell 1 comprises a live load introduction end 3, a dead end 4, and a bending beam arrangement 2 extending between and interconnecting the live end 3 and the dead end 4. The bending beam arrangement 2 includes an upper beam element 5 and a lower beam element 6. Thus, the load cell 1 is preferably and advantageously a dual beam load cell arrangement, which has only the two illustrated bending beam elements, and omits a third central beam element (and especially a central ring-shaped element). Thereby, the configuration is simpler, the machining costs are lower, and the profile height is reduced, in comparison to the conventional triple beam load cell 1' schematically shown in FIG. 1. Also, the resulting shape has smooth contours without corners, "nooks and crannies", and therefore does not result in the puddling of liquids when the load cell is used in a wet environment.

The load cell 1 can be manufactured from a single integral monolithic block of the desired metal material, for example stainless steel, titanium, or aluminum. The required machining is rather simple, because the upper and lower beam elements 5 and 6 can be formed by simply boring four cylindrical holes in the transverse direction through the load cell body (perpendicular to the plane of the drawing sheet) and then milling out the material between the four bored holes in an H pattern. These simple boring and milling steps leave behind the upper beam element 5 with two narrow necked sensing sections 8, and the lower beam element 6 with two similar narrow necked sensing sections 8. The sensing sections 8 are necked or made narrow in this manner, so as to concentrate the stress and thereby amplify the strain developed through the respective beam element, directly at the sensing sections 8.

Accordingly, respective strain gages 9 of any conventionally known type are affixed in any conventionally known manner onto the upper beam element 5 and the lower beam element 6 directly at the locations of the sensing sections 8. The strain gages 9 are merely schematically indicated by a dashed line in the drawing figures. Actually the strain gages 9 would not be visible from the outside, because they are enclosed and hermetically sealed as will be described next. In any event, the strain gages 9 may be according to any conventional strain gage configuration, arrangement, and mounting method. As an example, a foil strain gage is adhesively bonded onto the outer surface of the upper beam element 5 and of the lower beam element 6, respectively. A shielded multi-conductor cable 12 extends from and is sealed to the dead end 4, as will be discussed further below.

It is significant in the inventive load cell 1, that the strain gages 9 are arranged on one or more flat planar outer beam surfaces of the bending beam arrangement 2, i.e. flat surfaces that face laterally outwardly away from a median line or median plane M that extends longitudinally along the center of the load cell 1. Such placement of the strain gages 9 on the flat planar outwardly facing surfaces of the bending beam arrangement 2 provides easy access to the strain gage locations for original fabrication of the load cell 1, i.e. mounting the strain gages 9 and thereafter mounting and sealing the hermetic seal caps 11, as will be discussed next, and for later service thereof if necessary. Namely, in the event of the failure or a fault of a strain gage 9, the outward facing arrangement provides easy access to remove the respective seal cap 11, remove and replace the faulty strain gage 9, and then replace and reseal the seal cap 11.

As further shown in FIG. 2, the areas of the strain gages 9 are each individually sealed respectively by a hermetic seal cap 11, which is placed over the respective strain gage 9 on the flat planar outer surface of the bending beam arrangement 2, and is then thermally fused in place to establish a total hermetic seal, i.e. a heat-fused hermetically sealed joint 11", around the rim of the hermetic seal cap 11 onto the outer surface of the bending beam arrangement 2. The rim of the cap is preferably an outwardly flared rim 11' as explained below. The thermal fusing may involve welding, brazing, or soldering. Preferably welding, more preferably laser welding, and particularly pulsed YAG laser welding is used to secure and seal the rim of the hermetic seal cap 11 onto the outer surface of the bending beam arrangement 2.

The seal caps 11 are preferably made of the same material as the load cell body, preferably a corrosion resistant metal, such as stainless steel, titanium, or aluminum, whereby stainless steel and titanium are especially preferred. Thereby, the overall result is a substantially integral hermetically sealed load cell arrangement, whereby the entire exposed external surface of the load cell 1 is (e.g.) a stainless steel surface, and the joint of the hermetic seal cap 11 onto the bending beam arrangement 2 is a thermally fused, substantially integral, and perfectly hermetically sealed, joint formed by laser welding around the rim of the hermetic seal cap 11. This laser welded joint is also very durable, so that the hermetically sealed load cell 1 has a long operating life, with a substantially permanent hermetic seal, even under the harshest or most severe operating environments.

Figure 3:
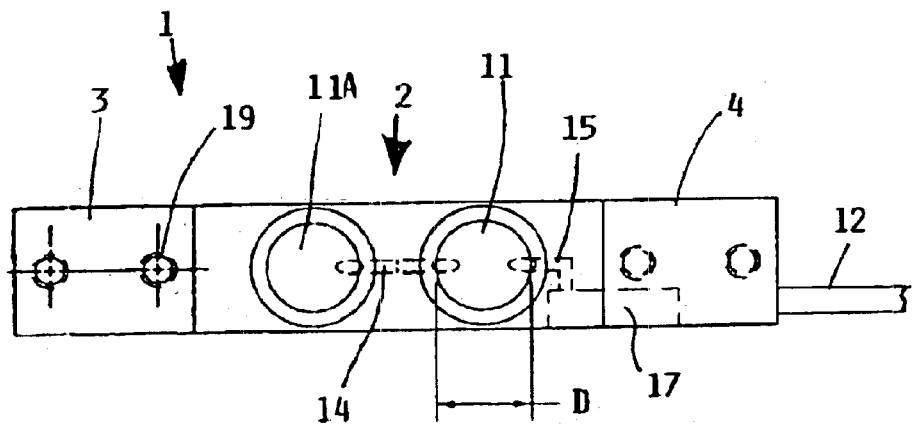
FIG. 3 is a schematic top plan view of the load cell according to FIG. 2, showing certain internal structures with dashed lines.
Figure 4:
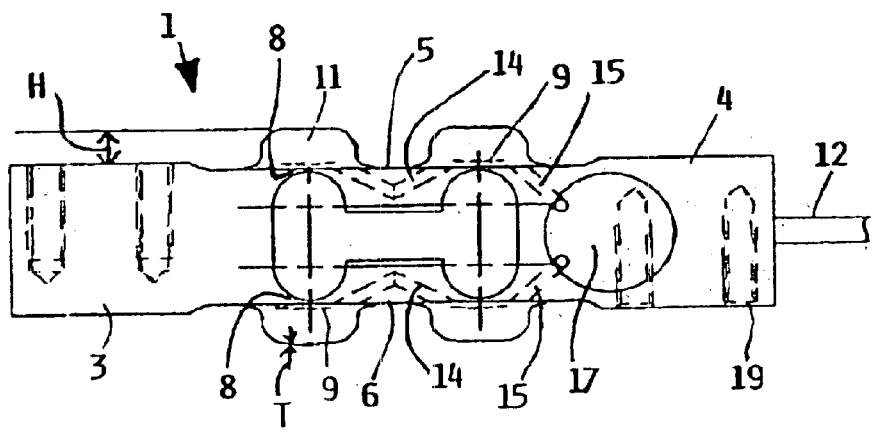
FIG. 4 is a schematic side view of the load cell according to FIG. 2, but additionally showing certain internal structures with dashed lines.

While FIG. 2 shows a general overview of the inventive load cell 1, further details of various configurations thereof will now be described in connection with FIGS. 3 to 10. FIGS. 3 and 4 illustrate the present most preferred embodiment, in which the load cell 1 includes respective strain gages 9 applied at four areas corresponding to two sensing sections 8 respectively on the upper beam element 5 and on the lower beam element 6. Correspondingly, four individual hermetic seal caps 11 are arranged to cover the four areas of strain gages 9, and are thermally fused, e.g. preferably laser welded, onto the flat planar outer surface of the respective beam element 5, 6, to provide a hermetically sealed enclosure for the respective strain gages 9. Thus, as can be seen in FIG. 4, there are four individual hermetic seal caps 11 in this embodiment.

In the present embodiment, as seen in FIG. 3, each seal cap 11 has a substantially circular plan shape 11A, and a sectional profile that is substantially cup-shaped or bowl-shaped, including a flat bowl base, a cylindrical or annular curving side wall, and a flared rim on a flat rim plane along which the seal cap 11 is laser welded and hermetically sealed onto the respective beam element 5, 6. The protrusion height H, the diameter D, and the wall thickness T of each hermetic seal cap 11 will vary depending on the particular application, e.g. the physical dimensions of the load cell, the load capacity range of the load cell, the material of the load cell body and the hermetic seal cap, etc. For typical applications using stainless steel for the load cell body and the hermetic seal cap, the protrusion height H will be in a range from 0.035 inches to 0.3 inches (typically 0.1 to 0.3 inches), the diameter D will typically be from 0.6 to 0.8 inches, especially about 0.7 inches, and the wall thickness T should generally be as thin as possible for the application within the range of 0.0025 inches to 0.005 inches (2.5 to 5 mils). The preferred range of the wall thickness T is 0.0025 to 0.003 inches (2.5 to 3 mils).

The particular dimensions H, D, and T must be selected for the particular application as discussed above. The wall thickness T should be as thin as possible while still providing the required mechanical protective enclosure for the strain gages 9. By making the hermetic seal caps 11 as thin as possible, i.e. T being as small as possible, the amount of stress taken up by the seal cap 11 rather than the respective associated sensing section 8 is minimized, and thereby the falsifying influence of the seal cap 11 on the development and the measurement of the strain in the sensing section 8 by the strain gage 9 is also minimized. The protrusion height H should be made larger so as to minimize the influence of the seal cap 11 on the development and the measurement of the strains. Namely, as the height of the annular or cylindrical side walls of the seal cap 11 increases, there is more flexible "give" or yielding of these side walls, thereby isolating any stress influences from the flat planar disk forming the flat base of the cup or bowl shape of the seal cap 11. On the other hand, the protrusion height H must be kept small in many applications, to remain within the size limitations of the space available for the installation of the load cell. The above cited range of the protrusion height H satisfies both of these competing requirements.

FIGS. 3 and 4 further show additional significant features of the load cell 1. For bolting the load cell 1 to a load introduction element (e.g. a weighing scale platform) on the one hand, and to a fixed stationary base on the other hand, mounting bolt holes 19 are provided in the live end 3 and in the dead end 4, respectively. An electronics cavity 17 is provided in the dead end 4, e.g. in the form of a cylindrical bore penetrating into the lateral side face of the dead end 4. This electronics cavity 17 houses the electronic circuitry (not shown), such as an electronic weigh bridge circuit, which receives, pre-processes and pre-analyzes the electrical signals from the strain gages 9, and then provides corresponding output signals that will be further externally processed or evaluated to achieve the weight measurement. A shielded multi-conductor cable 12 is connected and hermetically sealed to the dead end 4, and is internally electrically connected to the electronic circuitry in the electronics cavity 17, to carry the output signals.

It is also necessary, of course, for the several strain gages 9 to be connected by wires or fine conductor traces to the electronic circuitry in the electronic cavity 17. For this purpose, it is necessary to pass the wires out of the hermetically sealed enclosure of each respective seal cap 11, without disrupting the hermetic seal. This is achieved according to the invention, by providing wiring tunnels 14 and 15. The wiring tunnels 14 and 15 are located so that they avoid the narrow necked sensing sections 8, so as to minimize any influence on the strain development in the sensing sections 8 and thereby minimize any influence on the strain measurement by the strain gages 9.

The intermediate wiring tunnel 14 comprises two linear bored holes that intersect each other in a V-shape to form a tunnel between the two seal caps 11 on each of the beam elements 5 and 6. This wiring tunnel 14 allows wires to pass from the strain gages 9 closer to the live load introduction end 3 into the hermetic enclosure of the hermetic seal caps 11 closer to the dead end 4. The end wiring tunnels 15 each comprise an obliquely sloping linear bored hole that extends along a central vertical plane of the load cell from within the hermetic seal cap 11 closer to the dead end 4, toward the electronic cavity 17 in the dead end 4, as well as a transverse linear bored hole that extends from the electronic cavity 17 to intersect the obliquely sloping bored hole. The wires from all of the strain gages pass through this end wiring tunnel 15 from the enclosure within the hermetic seal cap 11 closer to the dead end 4 into the electronics cavity 17, where these wires are then connected to the electronic circuitry.

To maintain the overall hermetic seal of the load cell 1, the electronics cavity 17 is closed with a flat cover disk of stainless steel or the like, and this cover disk is thermally fused, and preferably welded (e.g. laser welded or TIG welded), in a hermetically sealed manner onto the dead end 4 of the load cell body. As mentioned above, the shielded multi-conductor cable 12 is also hermetically sealed relative to the dead end 4, in any conventionally known manner. With this construction and arrangement, the entire load cell is hermetically sealed and suitable for use in harsh or severe application environments.

Figure 5:
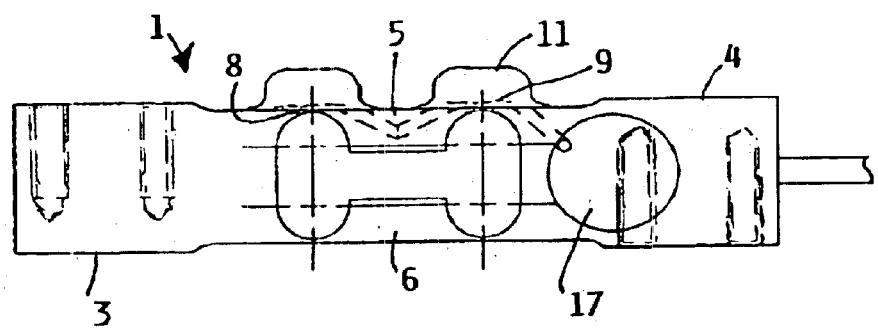
FIG. 5 is a schematic side view of an alternative embodiment of a double beam load cell according to the invention, having strain gages and hermetic seal caps only on the upper bending beam.
Figure 6:
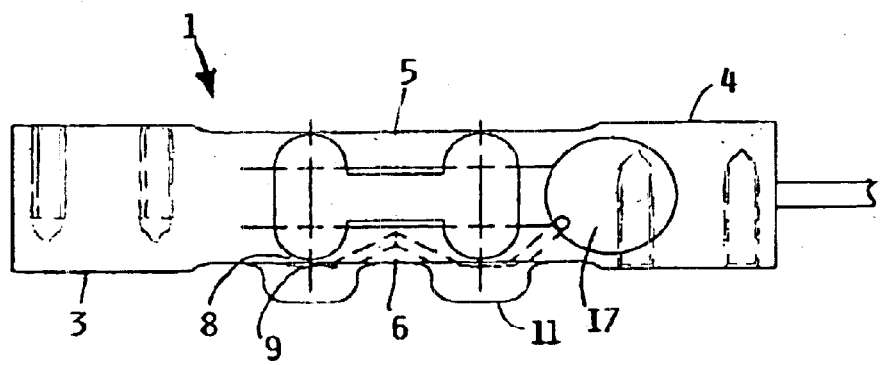
FIG. 6 is a schematic side view of a further alternative load cell according to the invention, having strain gages and hermetic seal caps only on the lower bending beam.

The preferred embodiment according to FIGS. 2 and 4 includes four active sensing sections 8, with four areas of strain gages 9, hermetically sealed and enclosed by four seal caps 11, namely two each on the upper beam element 5 and on the lower beam element 6. Such an arrangement is, however, not a necessary limitation of the inventive load cell 1. FIGS. 5 and 6 show two alternatives. In FIG. 5, the load cell 1 has active sensing sections 8, strain gages 9, and seal caps 11 only on the upper beam element 5, and not on the lower beam element 6. On the other hand, the arrangement of FIG. 6 has active sensing sections 8, strain gages 9, and seal caps 11 only on the lower beam element 6, but not on the upper beam element 5. Otherwise, the features of the embodiments of FIGS. 5 and 6 correspond to those discussed above in connection with FIGS. 2 to 4.

Figure 7:
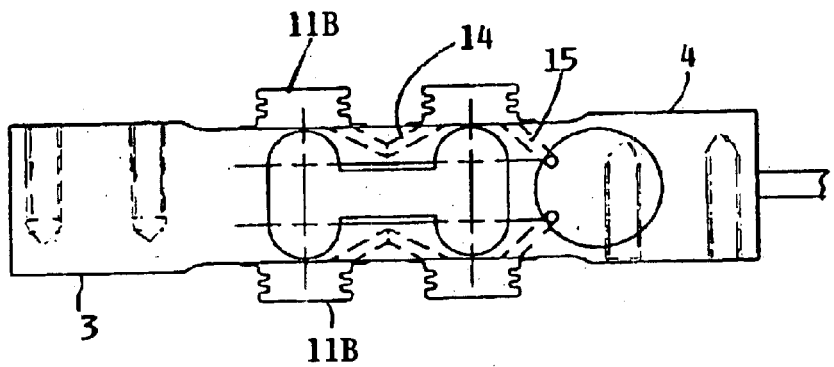
FIG. 7 is a schematic side view similar to that of FIG. 4, but showing an alternative configuration of the hermetic seal caps, having side walls with bellows pleats or crimps.

FIG. 7 illustrates a variation of the configuration of the seal caps 11. In FIGS. 3 and 4 above, the seal caps 11 are relatively simple circular bowl-shaped or cup-shaped seal caps. In contrast, the seal caps 11B according to FIG. 7 have a circular plan shape (e.g. as shown in FIG. 3), but have a sectional profile in which the cylindrical side walls have undulations in the manner of bellows pleats. Such a seal cap 11B is still generally "cup-shaped", but the bellows configuration of the side walls provides an increased side wall effective length to improve the isolation of the stress from the flat disk forming the base of the seal cap 11B, without increasing the actual physical protrusion height of the seal cap 11B.

Test comparing the performance of a load cell equipped with simple smooth-sided cup-shaped seal caps relative to the performance of a load cell equipped with bellows-sided cup-shaped seal caps 11B, show that the stress isolation and the minimization of the influence on the strain measurement is already extremely good with the simple smooth-sided seal cap configuration 11A according to FIGS. 3 and 4, and only marginally better with the bellows caps 11B. Namely, tests have shown that the amount of stress and strain taken up by the flat planar disk forming the base of the simple smooth-sided cup-shaped seal cap is extremely small, i.e. so small as to be negligible. The deflection of the cylindrical side walls of the seal caps 11 ensures that the stress and strain are adequately isolated, so that there is only a negligible influence on the strain development in the sensing sections 8. It has been found that the laser welding of the material of the beam elements itself has a greater influence on the strain measurement, than does the actual structure of the seal cap 11. In any event, the total influence on the strain measurement, which results from providing the hermetic seal caps 11, is extremely small and can readily be compensated for in the electronic circuitry when calibrating the strain gages 9 in a generally conventional manner.

The slight additional improvement in strain isolation provided by the bellows sidewalls of the caps 11B may be beneficial in specialized applications, but the additional costs for the fabricating the bellows-sided caps 11B relative to the simple smooth-sided cup-shaped caps are not justified or worthwhile in most typical applications. The more complex shape of the bellows-sided seal caps 11B makes the fabrication thereof substantially more difficult than the simple smooth-sided seal caps. Since the seal caps 11 have a general concave smooth-sided bowl-shape or cup-shape with no undercut or reverse flare, these seal caps 11 may be formed in one step simply by stamping a male plunger into a female die of appropriate shape. It is simple, quick, and economical to stamp cut a circular disk of the cap material, and then stamp-form this disk into the finished smooth-sided cup-shape in a single stamping stroke. On the other hand, fabrication of the bellows-sided caps 11B requires more-complicated forming tools and more-complicated forming steps, to crimp and upset the sidewalls, whereby these caps 11B are substantially more expensive.

Figure 8:
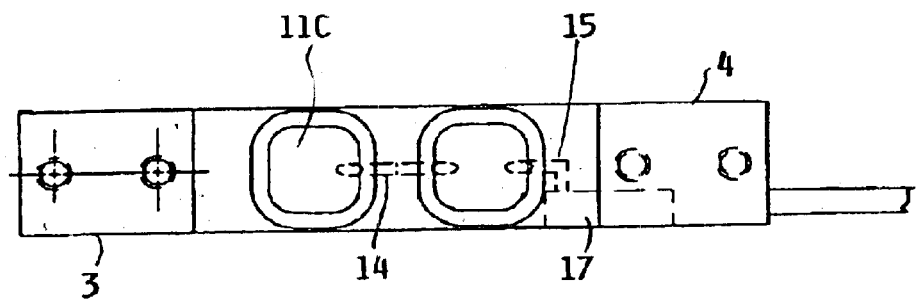
FIG. 8 is a schematic top view similar to that of FIG. 3, but showing an alternative square plan shape of the hermetic seal caps.

The top plan view of FIG. 8 represents yet another alternative configuration of the seal caps, namely as seal caps 11C having a substantially square plan shape with rounded corners. Such square seal caps 11C can have a cross-sectional profile of a simple smooth-sided cup-shape as shown in FIG. 4, or with a bellows-sided cup-shape as shown in FIG. 7. Also, the square plan shape seal caps 11C can be used in any of the arrangements shown in FIGS. 4, 5 or 6. The square plan shape provides approximately the same simplicity, low cost, and performance of the round plan shape 11A of the smooth-sided cup-shaped seal caps 11A discussed above. The square seal caps 11C can provide a slightly larger, or differently configured sealed enclosure space than the seal caps with a round plan shape 11A, which may be useful for particular strain gages.

Figure 9:
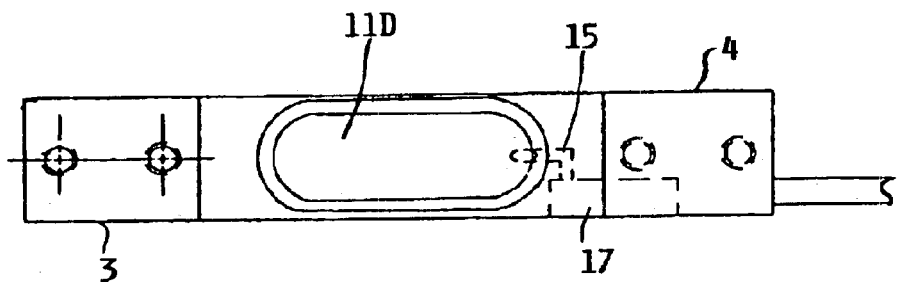
FIG. 9 is a schematic top view similar to that of FIG. 3, but showing a further variant in which a single oval or oblong seal cap covers two areas of strain gages at the two separate sensing areas along the length of the upper bending beam element.
Figure 10:
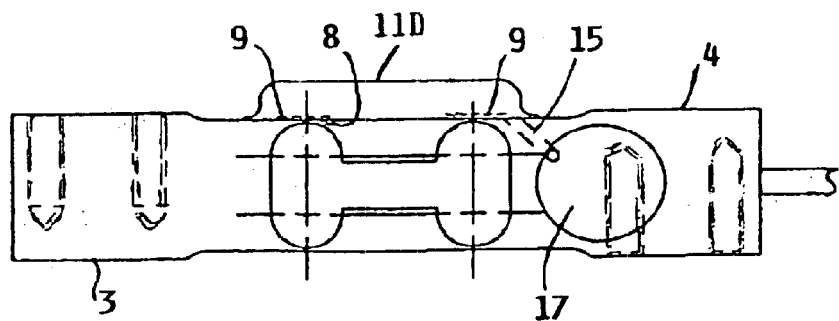
FIG. 10 is a schematic side view of the load cell having the hermetic seal cap configuration according to FIG. 9.

FIGS. 9 and 10 represent a further embodiment of a hermetic seal cap, whereby a single elongated oval or oblong seal cap 11D covers both areas of strain gages 9 at both sensing sections 8 on a given one of the beam elements 5 or 6. While FIG. 10 shows only a single seal cap 11D on the upper beam element 5, it should be understood that another one of the seal caps 11D could be provided to cover corresponding additional strain gages 9 arranged at both of the sensing sections 8 of the lower beam element 6, as well. In any event, the use of such a single elongated seal cap 11D covering both areas of strain gages 9 provides a larger hermetically sealed or encapsulated space therein, e.g. to accommodate larger strain gages, wiring and the like. This larger elongated single seal cap 11D also avoids the intermediate wiring tunnel 14, which would otherwise be needed to connect between two separate seal caps 11A, 11B, 11C. The end wiring tunnel 15 communicates from the interior of the seal cap 11D into the electronics cavity 17 in the same manner as discussed above.

As has been explained, all of the embodiments of the present hermetic seal caps achieve excellent stress and strain isolation, and therefore have a minimal influence on the strain measurement by the strain gages 9. As a result, it becomes possible to design the load cell to achieve a rather low load capacity range, because the falsifying influence of the hermetic seal arrangement is no longer a limiting factor. Sample load cells according to the invention have been fabricated and tested, with certifiable accuracy for a load range down to 5 kg. Additionally, design calculations and preliminary tests have indicated that a minimum load capacity of 1 kg can be achieved, especially when using titanium for the load cell body and for the seal cap.

All of the seal cap configurations 11, 11A, 11B, 11C and 11D described above are regarded as generally "up-shaped". The common features of a "cup-shaped" seal cap are a closed base, an open rim lying on a flat plane, and a closed sidewall transitioning between the base and the rim and providing some protrusion height of the base away from the rim in a direction perpendicular to the plane of the rim.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A load cell comprising:
   a load cell body including a strainable sensing section having a surface selected from the group consisting of an outer surface that faces outwardly away from a median plane extending longitudinally through said load cell body, and a flat planar surface;
   a strain gage arranged on said surface; and
   a cup-shaped seal cap that is arranged on said surface so as to enclose said strain gage, and that is heat-fused onto said surface so as to form a heat-fused hermetically sealed joint therebetween.

2. The load cell according to claim 1, wherein said load cell body and said seal cap consist of titanium.

3. The load cell according to claim 1, wherein said seal cap has a wall thickness of not more than 0.005 inches.

4. The load cell according to claim 1, wherein said seal cap has a protrusion height from said surface in a range from 0.1 inches to 0.3 inches.

5. The load cell according to claim 1,
   wherein said load cell body further includes a strainable second sensing section at a location spatially separated from said strainable sensing section,
   wherein said load cell further comprises a second strain gage arranged on said surface at said second sensing section, and
   wherein said load cell further comprises a second cup-shaped seal cap that is arranged on said surface so as to enclose said second strain gage separately from said strain gage, and that is heat-fused onto said surface so as to form a hermetically sealed joint therebetween.

6. The load cell according to claim 1, having a minimum load capacity at or below 1 kg.

7. A load cell comprising:
   a live load introduction end;
   a dead end;
   a first bending beam element extending and connecting between said live load introduction end and said dead end, wherein said first bending beam element consists of titanium, includes a strainable first sensing section, and has a first beam surface extending on one side thereof;
   a first strain gage arranged on said first beam surface at said first sensing section; and
   a first cup-shaped seal cap that consists of titanium, is arranged on said first beam surface so as to enclose said first strain gage, and is heat-fused onto said first beam surface so as to form a hermetically sealed joint therebetween.

8. A load cell comprising:
   a live load introduction end;
   a dead end;
   a first bending beam element extending and connecting between said live load introduction end and said dead end, wherein said first bending beam element includes a strainable first sensing section and has a first beam surface extending on one side thereof;
   a first strain gage arranged on said first beam surface at said first sensing section; and
   a first cup-shaped seal cap that is arranged on said first beam surface so as to enclose said first strain gage, and that is heat-fused onto said first beam surface so as to form a hermetically sealed joint therebetween;
   wherein said cup-shaped seal cap has at least one feature selected from the group consisting of a wall thickness of not more than 0.005 inches and a protrusion height from said first beam surface in a range from 0.1 inches to 0.3 inches.

9. A load cell comprising:
   a live load introduction end;
   a dead end;

a first bending beam element extending and connecting between said live load introduction end and said dead end, wherein said first bending beam element has a first beam surface extending on one side thereof, and includes strainable first and second sensing sections at respective spatially separated locations along said first beam surface;

a first strain gage arranged on said first beam surface at said first sensing section;

a second strain gage arranged on said first beam surface at said second sensing section;

a first cup-shaped seal cap that is arranged on said first beam surface so as to enclose said first strain gage, and that is heat-fused onto said first beam surface so as to form a hermetically sealed joint therebetween; and a second cup-shaped seal cap that is arranged on said first beam surface so as to enclose said second strain gage separately from said first strain gage, and that is heat-fused onto said first beam surface so as to form a hermetically sealed joint therebetween.

10. A load cell comprising:
a live load introduction end;
a dead end;
a first bending beam element extending and connecting between said live load introduction end and said dead end, wherein said first bending beam element includes a strainable first sensing section and has a first beam surface extending on one side thereof;
a first strain gage arranged on said first beam surface at said first sensing section; and
a first cup-shaped seal cap that is arranged on said first beam surface so as to enclose said first strain gage, and that is heat-fused onto said first beam surface so as to form a heat-fused hermetically sealed joint therebetween.

11. The load cell according to claim 10, wherein said first beam surface is a flat planar surface.

12. The load cell according to claim 10, wherein said first beam surface is an outer surface that faces outwardly away from a median plane extending longitudinally through said load cell from said live load introduction end to said dead end.

13. The load cell according to claim 10, wherein said load cell is a dual beam load cell that further comprises a second bending beam element extending parallel to said first bending beam element between said live load introduction end and said dead end, and wherein said load cell includes a total of two beam elements consisting of said first and second bending beam elements and expressly excludes a third beam element extending between said live load introduction end and said dead end.

14. The load cell according to claim 10, wherein said first bending beam element is a straight linear bending beam element and does not include a ring-shaped portion.

15. The load cell according to claim 10, wherein said first bending beam element and said cup-shaped seal cap each consist of stainless steel.

16. The load cell according to claim 10, wherein said first bending beam element and said cup-shaped seal cap each consist of titanium.

17. The load cell according to claim 10, wherein said cup-shaped seal cap is heat-fused onto said first beam surface by laser welding, and said hermetically sealed joint is a laser welded joint as results from said laser welding.

18. The load cell according to claim 10, wherein said cup-shaped seal cap is heat-fused onto said first beam surface by YAG pulsed laser welding, and said hermetically sealed joint is a pulsed laser welded joint as results from said YAG pulsed laser welding.

19. The load cell according to claim 10, wherein said cup-shaped seal cap has a wall thickness in a range from 0.0025 inches to 0.005 inches (2.5 mils to 5.0 mils).

20. The load cell according to claim 10, wherein said cup-shaped seal cap has a wall thickness of not more than 0.003 inches (3 mils).

21. The load cell according to claim 10, wherein said cup-shaped seal cap has a protrusion height from said first beam surface in a range from 0.1 inches to 0.3 inches.

22. The load cell according to claim 10, wherein said dead end has an electronics cavity therein adapted to receive electronic circuitry, and at least one of said first bending beam element and said dead end has therein an end wiring tunnel communicating from said first beam surface within said first cup-shaped seal cap to said electronics cavity and enabling conductors to extend from said first strain gage to the electronic circuitry.

23. The load cell according to claim 10, wherein said first cup-shaped seal cap encloses therein only a single strain gage consisting of said first strain gage.

24. The load cell according to claim 10,
wherein said first bending beam element further includes a strainable second sensing section at a location spatially separated from said first sensing section,
wherein said load cell further comprises a second strain gage arranged on said first beam surface at said second sensing section, and
wherein said first cup-shaped seal cap has an elongated shape so as to enclose both said first strain gage and said second strain gage in common within said first cup-shaped seal cap.

25. The load cell according to claim 10, wherein said first cup-shaped seal cap has a flat base oriented away from said first beam surface, an outwardly flared rim that is heat-fused onto said first beam surface, and a perimeter sidewall that smoothly monotonously transitions and expands from said flat base to said outwardly flared rim.

26. The load cell according to claim 10, wherein said first cup-shaped seal cap has a flat base oriented away from said first beam surface, an outwardly flared rim that is heat-fused onto said first beam surface, and a perimeter sidewall that has bellows undulations and transitions from said flat base to said outwardly flared rim.

27. The load cell according to claim 10, wherein said first cup-shaped seal cap has a circular plan shape.

28. The load cell according to claim 10, wherein said first cup-shaped seal cap has a rectangular or square plan shape.

29. The load cell according to claim 10, wherein said first cup-shaped seal cap has an oblong oval plan shape.

30. The load cell according to claim 10, having a minimum load capacity at or below 5 kg.

31. The load cell according to claim 10, having a minimum load capacity at or below 1 kg.

32. The load cell according to claim 10,
wherein said first bending beam element further includes a strainable second sensing section at a location spatially separated from said first sensing section,
wherein said load cell further comprises a second strain gage arranged on said first beam surface at said second sensing section, and
wherein said load cell further comprises a second cup-shaped seal cap that is arranged on said first beam surface so as to enclose said second strain gage separately from said first strain gage, and that is heat-fused onto said first beam surface so as to form a hermetically sealed joint therebetween.

33. The load cell according to claim 32, wherein said first bending beam element has therein an intermediate wiring tunnel that communicates from said first beam surface within said second cup-shaped seal cap to said first beam surface within said first cup-shaped seal cap, and that enables conductors to extend therethrough.

* * * * *